UNITED STATES PATENT OFFICE.

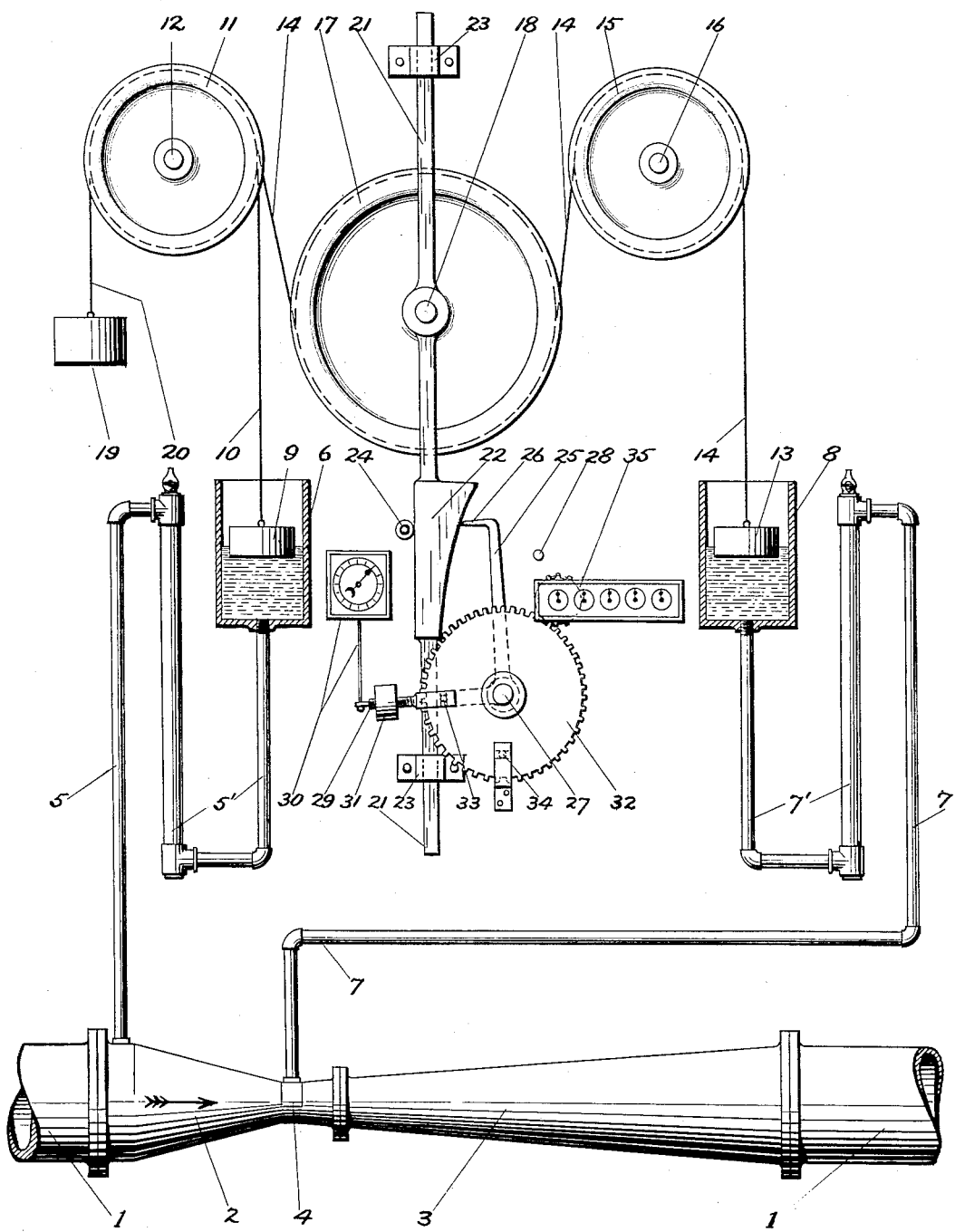

JOHN W. LEDOUX, OF SWARTHMORE, PENNSYLVANIA.

LIQUID-METER.

No. 861,866.

Specification of Letters Patent.

Patented July 30, 1907.

Application filed April 19, 1906. Serial No. 312,539.

*To all whom it may concern:*

Be it known that I, JOHN W. LEDOUX, a citizen of the United States, and a resident of Swarthmore, in the county of Delaware and State of Pennsylvania, have invented certain Improvements in Liquid-Meters, of which the following is a specification.

This invention is a liquid meter comprising, in its preferred construction, a pair of float chambers connected respectively with a normal and contracted section of a conduit, floats in the respective chambers with connecting mechanism for adjusting the position of a cam relatively thereto, and constantly operating mechanism regulated by the position of the cam for indicating the flow in the conduit.

In the drawing the figure represents a diagrammatic view of the invention.

The apparatus comprises the conduit 1 having the parts 2 and 3 contracting to the throat 4. A tube 5 with the drop 5' therein leads from a normal section of the conduit to the float chamber 6, and a tube 7 with the drop 7' therein leads from the throat of the conduit to the float chamber 8. A float 9 in the chamber 6 is connected by a cord 10 with a sheave 11 revolving on a stationary axis 12, and a float 13 in the chamber 8 is connected by a cord 14 which passes over a sheave 15 revolving on a stationary axis 16, and under a sheave 17 revolving on a movable axis 18 to the sheave 11, the parts being balanced by a counter-poise 19 connected by a cord 20 with the sheave. A rod 21 with the cam 22 thereon is carried by the sheave 17 and reciprocates in the guides 23, a roller 24 in the rear of the cam supporting it. A lever 25 with a tappet 26 oscillates upon the axis 27 between the cam 22 and a fixed stop 28, the lever being operated by having an arm 29 which is elevated at regular intervals by a clock 30 and lowered by a weight 31. A spur wheel 32, revoluble on the axis 27, is adapted to be engaged and operated by the clutch 33 carried by the lever arm. In the movement of the lever in one direction the clutch grips and actuates the wheel, while in the opposite movement of the lever the clutch runs free, a clutch mechanism 34 preventing a retrograde movement of the wheel. A register or indicating mechanism 35 is operated by the step by step movement thus imparted to the spur wheel.

In the usual operation, the pressure of the fluid in the conduit 1 is communicated through the tubes 5 and 7 to a heavier fluid as mercury contained in the parts 5', 6 and 7', 8. When there is no flow in the conduit, the pressure in the tubes reaches the maximum and the fluid in the chambers 6 and 8 lifts the floats 9 and 13 to a common elevation. The weight 19, acting with the floats causes the sheave 17 and the rod 21 to move to a position such that the cam 22 holds the tappet lever 25 back upon the stop 28 and no motion is imparted to the register. As the velocity of flow in the conduit increases to the maximum, the pressure in the tubes 5 and 7 decrease at unequal rates, so that the float 13 falls more rapidly than the float 9, causing the sheave 17 and the rod 21 to move the cam 22 toward the position at which the tappet 26 and the lever 25 have their greatest arc of oscillation, the stroke of the tappet lever 25 increasing with the rate of flow so that the register 35 is operated to indicate the volume of flow.

Having described my invention I claim:

1. A meter comprising a float, mechanism including a rectilineally reciprocating cam connected with and operated by said float, a tappet lever oscillating in an arc limited by the position of said cam, means for oscillating said lever an indicating apparatus, and mechanism whereby said lever operates said apparatus.

2. A meter comprising a conduit, a chamber connected with said conduit, a float in said chamber, mechanism including a rectilineally reciprocating cam connected with and operated by said float, an oscillating tappet lever controlled by said cam, means for oscillating said lever a register, and mechanism whereby said lever operates said register.

3. A meter comprising a conduit having a contracted section, a pair of floats adapted for movement at different rates, means for communicating pressure from a normal section and from said contracted section to the respective floats, a cam, and mechanism for communicating the differential movements of said floats to said cam.

4. A meter comprising a rectilineally reciprocating cam, a tappet mechanism limited in movement by the position of said cam, an indicating mechanism, and means operated by said tappet mechanism for actuating said indicating mechanism.

5. A meter comprising a conduit, a pair of tubes with drops therein, said drops being connected with sections of said conduit, subject to different pressures a pair of floats movable respectively with the movement of liquid in the respective tubes, a rectilineally reciprocating cam, mechanism for communicating the differential movement of said floats to said cam, and indicating apparatus connected with and operating under control of said cam.

6. A meter comprising a conduit, a pair of tubes connected with sections of said conduit subject to different pressures and terminating in independent chambers, a float in each chamber, a reciprocating cam, a sheave connected to said cam, a pair of sheaves, and means for connecting said floats with said sheaves whereby the differential movements of said floats are communicated to said cam.

7. A meter comprising a conduit, a pair of vessels having liquid connection only through said conduit, floats in said vessels and an indicating device operated under the influence of said floats.

8. A meter comprising a conduit, a tube having a drop therein connected with said conduit, said drop comprising downwardly and upwardly extending members a float movable in said upwardly extending member by fluid pressure communicated from said conduit through said tube, and indicating means connected with said float, said float being movable solely by pressure communicated through said tube.

9. A meter comprising a liquid conduit, an open tube connected with said conduit and containing a liquid heavier than that in said conduit, a float movable in said tube by the movements of said heavier liquid and indicating mechanism connected with said float.

In witness whereof I have hereunto set my name this 14th day of April, A. D. 1906 in the presence of the subscribing witnesses.

JOHN W. LEDOUX.

Witnesses:
 CHARLES N. BUTLER,
 CARLYLE H. ROSS.